United States Patent

Huber et al.

Patent Number: 5,831,394
Date of Patent: Nov. 3, 1998

[54] CIRCUIT ARRANGEMENT FOR THE PRODUCTION OF VOLTAGE PULSE SEQUENCES, IN PARTICULAR FOR THE OPERATION OF DIELECTRICALLY IMPEDED DISCHARGES

[75] Inventors: Andreas Huber, Maisach; Alwin Veser; Günther Hirschmann, both of Munich, all of Germany

[73] Assignee: Patent-Treuhand-Gesellschaft fur elektrische Gluehlampen mbH, Munich, Germany

[21] Appl. No.: 764,498

[22] Filed: Dec. 12, 1996

[30] Foreign Application Priority Data

Dec. 21, 1995 [DE] Germany .................. 195 48 003.1

[51] Int. Cl.$^6$ .................................. H05B 37/02
[52] U.S. Cl. .................. 315/224; 315/219; 315/246; 315/260
[58] Field of Search ..................... 315/219, 246, 315/260, 268, 287, 169.1, DIG. 4, DIG. 5, 224

[56] References Cited

U.S. PATENT DOCUMENTS

| | | | |
|---|---|---|---|
| 4,544,862 | 10/1985 | Yamazaki et al. | 315/209 R |
| 4,583,026 | 4/1986 | Kajiwara et al. | 315/226 |
| 4,645,979 | 2/1987 | Chow | 315/169.1 |
| 4,887,002 | 12/1989 | Dobashi et al. | 313/607 |
| 5,604,410 | 2/1997 | Vollkommer et al. | 315/246 |

FOREIGN PATENT DOCUMENTS

WO 94/23442  10/1994  WIPO .

OTHER PUBLICATIONS

Schaltnetzteile:Konzepte, Bauelemente, Anwendungen; Hischmann et al pp. 176–177; 1990.

*Primary Examiner*—Robert J. Pascal
*Assistant Examiner*—Haissa Philogene
*Attorney, Agent, or Firm*—Carlo S. Bessone

[57] ABSTRACT

An electrical circuit arrangement for the production of voltage pulse sequences, in particular for the operation of dielectrically impeded discharges, has a charging circuit, with a charging capacitor (C2), fed with an input voltage ($U_E$), a discharge and pulse circuit with a fast controllable switch, in particular with an IGBT (T1), which is connected to a clocked drive circuit (A), and a pulse transformer (TR1) with a load (L) connected thereto, and a feedback circuit with a feedback rectifier, for example semiconductor diodes (D3–D4) and a feedback energy accumulation circuit, for example a buffer capacitor (C1) connected in parallel with the input of the charging circuit. During each phase in which the IGBT is on, the electrical energy stored in the charging capacitor (C2) is transferred via the pulse transformer (TR1) to the load (L). The energy reflected from the load (L) and the pulse transformer (TR1) passes through the feedback diodes (D3–D5), is fed to the feedback point (R) and is received by the buffer capacitor (C1). During the reflection phases, the potential of the secondary winding is thereby clamped to the potential of the input voltage ($U_E$). Furthermore, the energy fed back is in this way used as a contribution for the charging phases of the charging capacitor (C2).

11 Claims, 4 Drawing Sheets

CIRCUIT ARRANGEMENT FOR THE PRODUCTION OF VOLTAGE PULSE SEQUENCES, IN PARTICULAR FOR THE OPERATION OF DIELECTRICALLY IMPEDED DISCHARGES

FIELD OF THE INVENTION

The invention relates to an electrical circuit arrangement for the production of voltage pulse sequences, in particular for the operation of dielectrically impeded discharges.

BACKGROUND OF THE INVENTION

Such circuit arrangements are used for the production of voltage pulse sequences. Applications include the ignition and operation of discharge lamps, for example of flash lamps in the case of low pulse repeat frequencies.

In particular, the circuit arrangement according to the invention is used for the operation of discharge lamps or radiators having at least one dielectrically impeded electrode by means of unipolar or at least essentially unipolar voltage pulses, as described in WO 94/23442, for example. The mode of operation uses an in principle unrestricted sequence of voltage pulses which are separated from one another by dead times. Determining factors for the efficiency of the useful radiation production are essentially the pulse shape and the duration of the pulse or dead times. On the other hand, traditional modes of operation for lamps of this type use sinusoidal AC voltages.

In contrast to conventional discharges, as generally employed, for example, for discharge lamps, dielectrically impeded discharges have a dielectric arranged between at least one electrode. Charge-carrier transport from a dielectrically impeded electrode to the ionized gas of the discharge path therefore takes place not by means of a conduction current but by means of a displacement current. This results in a capacitive component in the equivalent electrical circuit diagram of a discharge of this type.

Pulse circuits, for example for the operation of flash lamps, are actually known. In this context, in the simplest case, a capacitor is charged through a resistor and discharged by means of a fast switch, for example a spark gap or a thyratron, through the primary winding of a pulse transformer. The voltage pulse then induced in the secondary winding of the pulse transformer ignites the flashlamp.

A disadvantage with circuit arrangements of this type is the fact that undesired current and voltage oscillations can take place. The result of this is that, on the one hand, the flash duration may be unintentionally lengthened, or alternatively the lamp may be ignited uncontrollably several times, because of coupled oscillations. This is unacceptable, in particular in scientific applications, which have quite defined conditions, for example in stroboscopic studies or in the optical pumping of substances. On the other hand, the voltage or current reversal then occurring may also overload electrical components, for example capacitors, and consequently shorten the life of the circuit.

Attempts are made to combat the problems indicated above by careful tuning of the lamp and circuit arrangement. The aim in this case is to use the plasma impedance of the gas discharge of the ignited flash lamp to damp the oscillator circuit essentially formed by the capacitance and the inductance of the arrangement. In the ideal case (aperiodic limit case) it is thus possible to produce a current or voltage pulse, or even repetitive ones is so desired, without interfering oscillations.

However, this approach fails in the case of discharge arrangements with dielectrically impeded electrodes, since the impedance of this arrangement acts essentially as a capacitance, or at least has a large capacitive component. As a result, the voltage across the lamp electrodes oscillates with high frequency and, according to the teaching of WO 94/23442, drastically reduces the efficiency of the lamp.

SUMMARY OF THE INVENTION

The object of the present invention is to overcome the stated disadvantage, and to provide a circuit arrangement which can be used to produce substantially unipolar voltage pulse sequences with low switching losses. A further intention is for voltage pulse sequences with the smoothest possible pulse shapes to be produced, in particular even on predominantly capacitively acting loads.

This object is achieved according to the invention by the characterizing features of claim 1. Further advantageous features and embodiments of the invention are explained in the subclaims.

The basic circuit of the invention consists of a charging circuit, a discharge circuit and a pulse and feedback circuit.

As known per se, the charging circuit consists of a series circuit consisting of a charging impedance and charging capacitor, which are connected to an input voltage. The charging impedance is preferably produced in the form of an inductor. The advantage over a resistor as the charging impedance is, on the one hand, the lower power loss. On the other hand, by suitable design of the charging inductor and charging capacitor, it is possible to achieve a resonant peak in the voltage across the charging capacitor relative to the input voltage. This may be advantageous with loads having a high voltage requirement.

The discharge circuit comprises the charging capacitor, a first rectifier, for example a semiconductor diode, the primary winding of a pulse transformer and a fast switch, preferably a transistor, in particular an IGBT (Insulated Gate Bipolar Transistor). The primary winding and the switch are connected to one another in series. For its part, the series circuit is connected in parallel with the charging capacitor. The switch is closed when the charging capacitor has reached its maximum voltage. Thereafter, the charging capacitor discharges through the rectifier into the primary winding of the pulse transformer. The rectifier prevents the energy from being reflected back to the charging capacitor from the pulse transformer or the load connected thereto. When the charging capacitor is fully discharged, the switch is opened without power loss and the charging capacitor is recharged through the charging inductor.

The pulse and feedback circuit comprises the secondary winding of the pulse transformer, the load, for example a discharge lamp with dielectrically impeded electrodes, connected to the secondary winding, and a feedback rectifier, for example a semiconductor diode, connected to a pole of the secondary winding, on the one hand, and to a feedback point, on the other hand. The feedback point is selected in such a way that the energy reflected by the load can be fed to this point. To this end, use is made of the input of a feedback energy accumulation circuit connected to the reference potential. A suitable reference potential is, for example, earth potential. When a controllable semiconductor switch, for example a transistor, is used as the fast switch, it is also preferably earthed. This simplifies the outlay on wiring of the corresponding control electrode (for example the base or gate electrode), since the control circuitry and the semiconductor switch have the earth potential in common.

Furthermore, this makes the control circuitry relatively unsusceptible to the faults. The earth potential is set as the reference potential of the pulse sequence at the output of the pulse transformer by earthing one pole each of the primary and secondary windings as well.

While the switch is closed, the energy of the charging capacitor is transferred to the connected load by using the pulse transformer. The energy reflected by the pulse transformer and by the load passes through the feedback rectifier, is fed to the feedback point and is received by the feedback energy accumulation circuit. As a result of this, during the reflection phase, the potential of the "hot" pole of the secondary winding is clamped to the potential of the feedback point.

The feedback energy accumulation circuit contains either a storage element, for example a capacitor which stores the reflected energy, or a converter component, which converts the reflected electrical energy into another form of energy, for example heat. In the simplest case, a suitable dissipative conversion component is a resistor whose top is connected to the feedback rectifier and whose bottom is connected to the reference potential, for example earth. A disadvantage with this solution is the effect on the feedback potential because of the voltage drop across the resistor.

In a particularly preferred embodiment, the buffer capacitor is connected in parallel with the input of the circuit arrangement. As a result, the feedback point is at the advantageously constant input potential. A further advantage of this measure is that the energy fed back can be used as a contribution to the charging process of the charging capacitor. For this reason, in this preferred case there is not a resistor connected as a convertor component in parallel with the buffer capacitor. Instead, the buffer capacitor is used as an intermediate store for the reflected energy. A rectifier, for example a semiconductor diode, connected between the buffer capacitor and the charging inductor prevents the energy from being reflected from the charging capacitor.

BRIEF DESCRIPTION OF THE DRAWINGS

The invention will be explained in more detail below with reference to an illustrative embodiment.

BEST MODE FOR CARRYING OUT THE INVENTION

Figure 1:
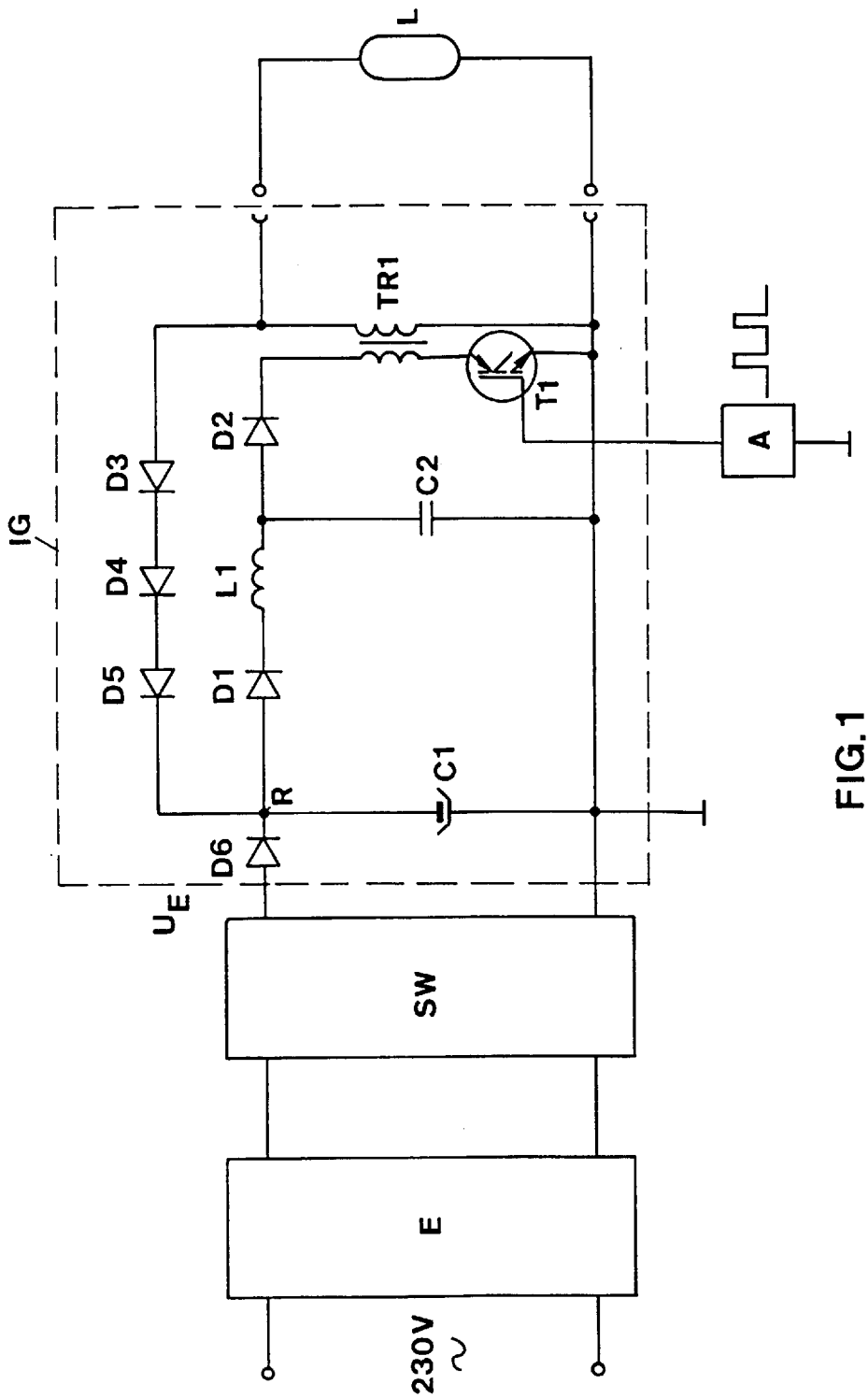
FIG. 1 shows circuit diagram of the circuit arrangement according to the invention for the operation of a lamp.

FIG. 1 represents a circuit diagram of an arrangement for the operation of a discharge lamp L with dielectrically impeded electrodes and a power of 20 W at 230 V mains voltage. The arrangement consists of the following functional units: An input part E, a subsequent flyback converter SW, a subsequent pulse generator IG and a drive circuit A. The pulse generator IG (framed by a broken line in FIG. 1) represents the actual novelty of the circuit arrangement and will therefore be explained particularly thoroughly below.

The input part E, the flyback converter SW and the drive circuit A are produced in a manner known per se and are therefore only schematically represented in FIG. 1 as functional units.

The input part E contains an interference-suppression and rectifier circuit, and is supplied with the 230 V mains voltage.

The subsequent flyback converter SW is used as an active harmonic filter with power regulation. The advantages are that the prescribed limit values are respected for the power factor and the mains current harmonics, on the one hand, and the constancy of the power of the lamp under mains voltage fluctuations, on the other hand. In the event of a mains voltage fluctuation in the range between 195 V and 253 V, the lamp power changes by only 0.2 W. Relative to the rated 20 W power consumption of the lamp, this corresponds to a 1% power variation. A further important argument for connecting the flyback converter SW upstream is the 200 V maximum permissable input voltage for the pulse generator IG (corresponding to the potential at the feedback point relative to earth). This requirement is based on the particularly efficient mode of operation of the lamp, which tolerates a voltage of opposite polarity of at most 200 V between the voltage pulses.

The drive circuit A essentially contains a square-wave generator for driving the IGBT T1 used as a fast switch in the pulse generator IG (IGBT: Insulated Gate Bipolar Transistor). The drive pulses are fed to the gate of the IGBT using a low-impedance driver which, for example, is described in the book by W. Hirschmann and A. Hauenstein "Schaltnetzteile" (Switched-mode Power Supplies), Verlag Siemens AG, 1990, p. 177, FIG. 4.98d. This achieves the step switching edges which are necessary for minimising the switching losses in the IGBT.

A buffer capacitor C1, connected in parallel with the input, and a series circuit, connected in parallel thereto and consisting of a diode D1, a charging inductor L1 and a charging capacitor C2, function as the charging circuit of the pulse generator IG. For a lamp power of 20 W, an ideal value of 15 nF was calculated for the charging capacitor. For a desired recharging time of 20 μs this gives an inductance of about 3 mH for the charging inductor.

The discharge circuit of the pulse generator IG is completed by a series circuit, connected in parallel with the charging capacitor C2 and consisting of a diode D2 with the prelacy winding of a pulse transformer TR1 and an IGBT T1.

The pulse and feedback circuit of the pulse generator IG comprises the secondary winding of the pulse transformer TR1, a 20 W lamp L which has dielectrically impeded electrodes, functions as the load and is connected to the secondary winding, three feedback diodes D3–D5, connected in series and functioning as feedback rectifier, as well as the buffer capacitor C1 which here functions as a feedback energy accumulation circuit.

The pulse transformer TR1 has a former with six compartments. The primary winding is wound on a first compartment. The secondary winding is distributed over the remaining five compartments. In the case of a 4 kV peak secondary voltage, the maximum voltage per compartment is thereby limited to 800 V. By separating the primary and secondary windings into different compartments, the weaker coupling advantageously gives a smoother pulse shape. One pole each of the primary and secondary windings are connected together and to the circuit earth as the reference potential. The winding sense of the pulse transformer is configured in such a way that voltage pulses which are negative with respect to earth are produced across the lamp electrodes. The essential values for the pulse transformer TR1 are summarized in the following table.

TABLE 1

Specifications of the Pulse Transformer TR1

| Core Material: | N87 (Siemens) | |
| --- | --- | --- |
| Winding | Primary | Secondary |
| Number of Compartments | 1 | 5 |
| Turns Number | 20 | 230 |
| Wire | 20 × 0.1 | 30 × 0.04 |
| Inductance | 110 mH | 14 mH |

The reason for producing the feedback active electrical component by three series feedback diodes D3–D5 with blocking voltages of 2 kV each is the distribution which this produces for the voltage peaks, about 4 kV, required for the lamp L. The series circuit D3–D5 is connected, on the one hand, to the "hot" pole of the secondary winding of the pulse transformer TR1 and, on the other hand, to the connection point, between the buffer capacitor C1 and the first diode D1, which acts as the feedback point R. As a result of this, the potential of the "hot" pole of the secondary winding is clamped to the potential of the feedback point, that is to say the output voltage $U_E$ of the upstream-connected flyback converter (about 200 V) during the reflection phases. A further diode D6 prevents the feedback current from flowing into the output of the upstream-connected flyback converter SW.

During each phase in which the IGBT T1 is on, the energy of the charging capacitor C2 is transferred to the connected lamp L by using the pulse transformer. The energy reflected by the lamp L and stored in the pulse transformer TR1 is fed into the buffer capacitor C1 through the feedback diodes D3–D5 and is then available to the charging capacitor C2 during the charging cycles.

The components used for the pulse generator IG in FIG. 1 are summarized in the following table.

TABLE 2

List of the Components Used for the Pulse Generator IG in FIG. 1.

| C1 | 47 mF |
| --- | --- |
| C2 | 15 nF |
| D1 | UF 4007 |
| D2 | IN4936 |
| D3 | BYT01 400 |
| D4–D6 | RGP02-20E |
| L1 | 3 mH |
| T1 | GB 30U |
| TR1 | See Table 1 |

Figure 2A:
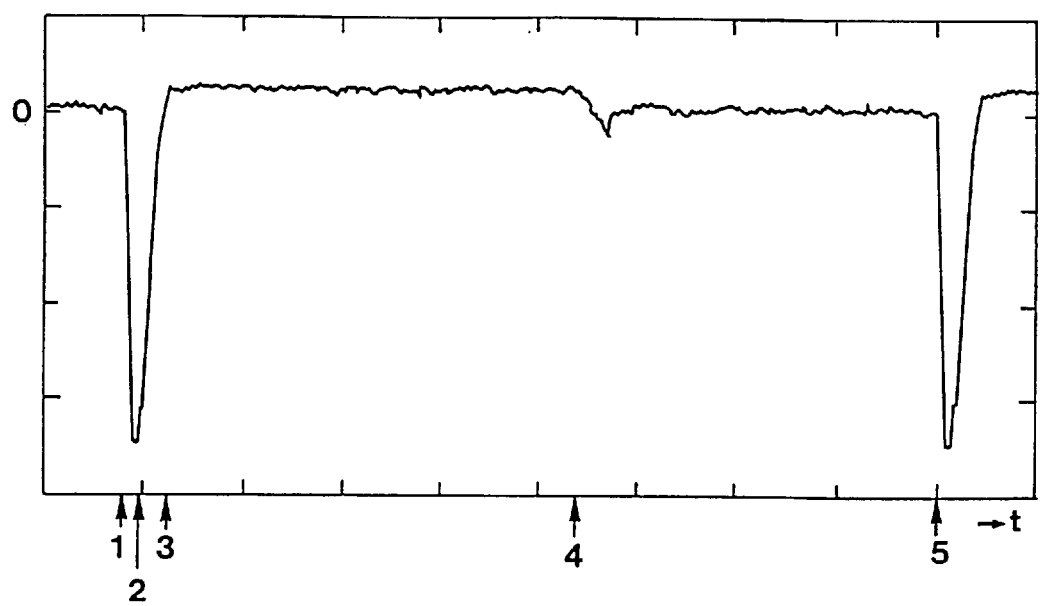
FIG. 2a shows a graphical representation of the voltage measured across the electrodes of the lamp in FIG. 1 as a function of time.
Figure 2B:
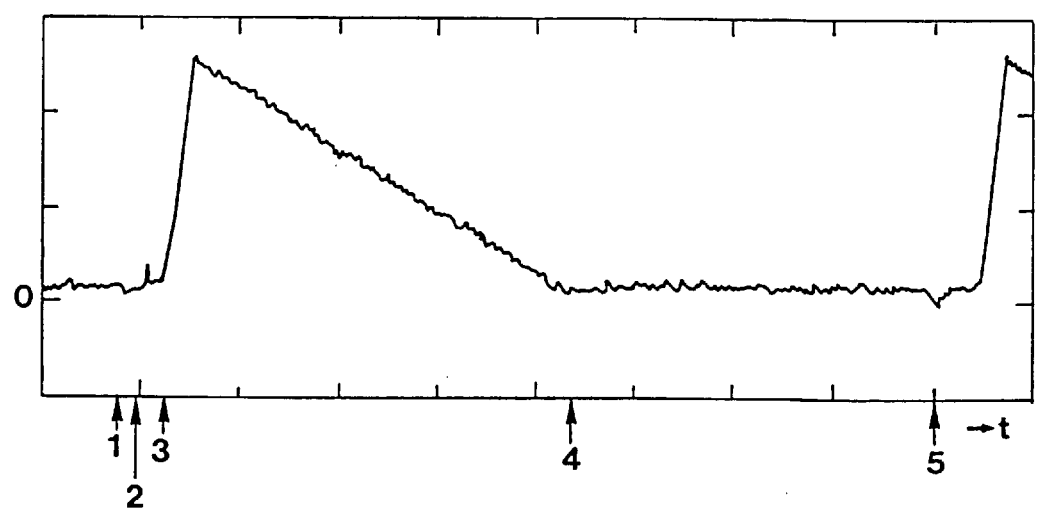
FIG. 2b shows a graphical representation of the feedback current associated with the voltage in FIG. 2, on the same timescale.
Figure 3:
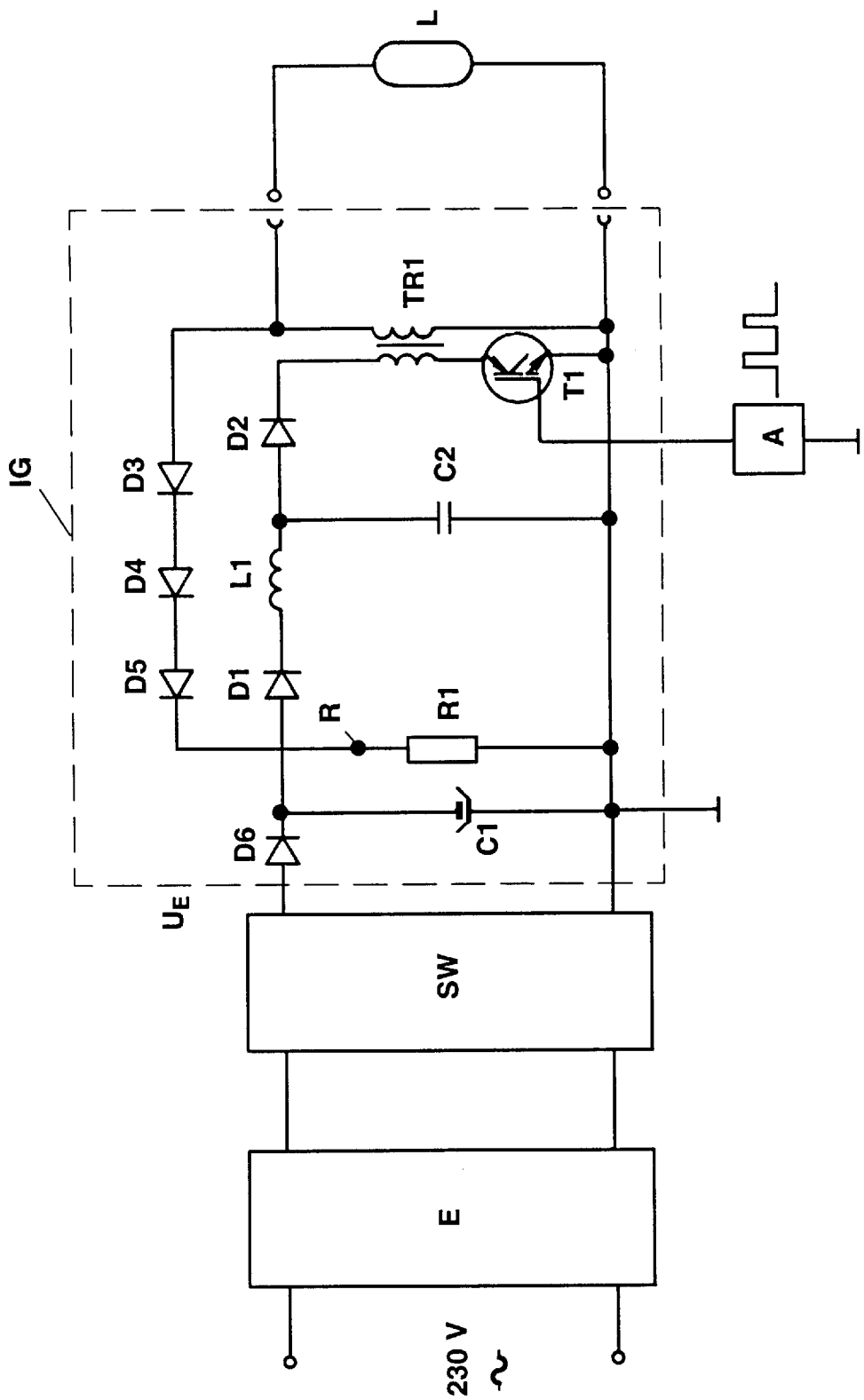
FIG. 3 shows a circuit diagram of the circuit arrangement according to another embodiment of the invention.

The two FIGS. 2a and 2b respectively show details of the time profiles (increasing time corresponds to the positive direction of the x-axis) of the voltage measured across the electrodes of the lamp L in FIG. 1, and of the associated feedback current (respective y-axes) through the diodes D3–D5. At time 1, the voltage between the electrodes (FIG. 2a) increases abruptly, starting from about 0 V, reaches its maximum value of approximately −3.5 kV after about 0.5 µs at time 2, and then likewise decreases abruptly thereafter. At time 3, the voltage has already crossed its zero value, and until time 4 remains clamped to the voltage at the input of the pulse generator IG (about 200 V). After this, the electrode voltage is approximately 0 V until time 5. The phase between times 1 and 3 corresponds to the respective pulse phases and lasts about 2 µs. The dead phases respectively correspond to the period between the times 3 and 5, and are each about 38 µs. Finally, this results in a mutual time separation between the respective voltage pulses of 40 µs, corresponding to a pulse repeat frequency of 25 kHz.

The reflection phase, visible from the steep rise in the feedback current (FIG. 2b), starts at time 3. The feedback current begins at a value of 0 A and, after reaching a maximum, falls back linearly to the initial value (which is again reached at time 4). The reflection phase is then finished.

Time 5 corresponds to the situation at time 1, and a new voltage pulse starts. The cycles indicated above for electrode voltage and feedback current are repeated for as long as the circuit arrangement is in operation.

Figure 4:
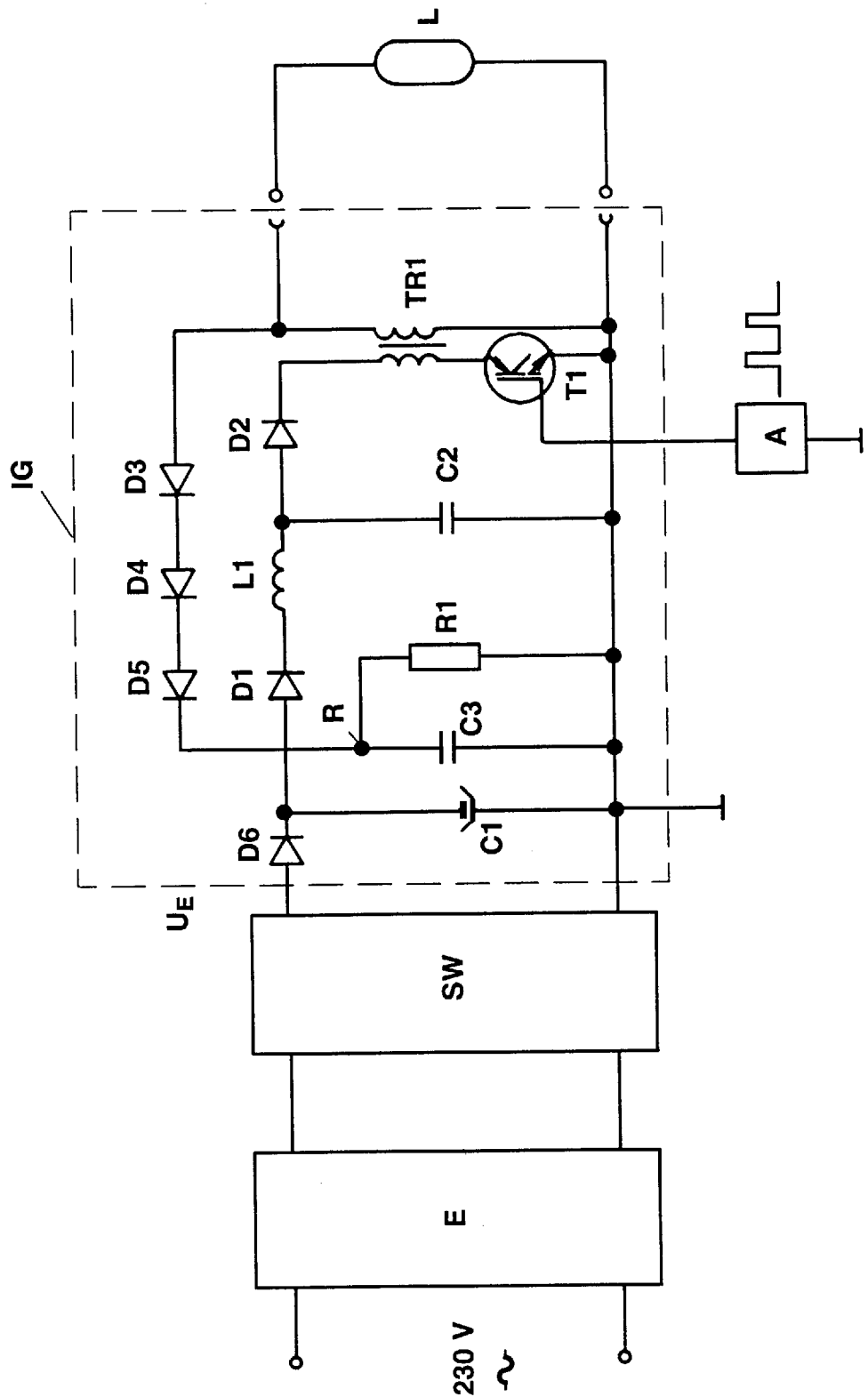
FIG. 4 shows a circuit diagram of circuit arrangement according to still another embodiment the invention.

In accordance with further teachings of the present invention, the feedback energy accumulation circuit may contain a converter component which converts the reflected electrical energy into another form of energy. In the embodiment shown in FIG. 4, the electrical conversion component is a resistor R1 which converts the reflected energy into heat. The top of resistor R1 is connected to feedback diodes D3–D5 and the bottom is connected to the reference potential. In FIG. 4, the feedback energy accumulation circuit consists of a capacitor C3 and a resistor R1 connected in parallel.

The invention is not limited to the illustrative embodiments indicated.

We claim:

1. Electrical circuit arrangement for the production of voltage pulse sequences, in particular for the operation of dielectrically impeded discharges, having a charging circuit which has a series circuit consisting of a charging impedance (L1) and a charging capacitor (C2), the series circuit connecting together the input of the charging circuit, so that application of a voltage $U_E$ to the input firstly charges the charging capacitor (C2) to a voltage $U_c$, a discharge circuit which, in addition to the charging capacitor (C2), comprises a series circuit consisting of a discharging rectifier (D2), the primary winding of a pulse transformer (TR1) and a fast controllable switch (T1) and a drive circuit (A) which alternately turns the switch (T1) on and off for preselectable periods of time, the series circuit being connected in parallel with the charging capacitor (C2), and the charging capacitor (C2) being discharged through the discharging rectifier (D2) and the primary winding when the switch (T1) is closed, a pulse circuit which comprises the secondary winding of the pulse transformer (TR1) and the load, for example a discharge lamp (L) with dielectrically impeded electrodes, connected to this secondary winding, characterized in that the circuit arrangement additionally has a feedback circuit consisting of a feedback rectifier (D3–D5) which is connected, on the one hand, to one pole of the secondary winding of the pulse transformer (TR1) and, on the other hand, to a feedback point (R), and a feedback energy accumulation circuit (C1) whose input functions as the feedback point (R), the energy reflected by the load (L) and by the pulse transformer TR1 being passed through the feedback rectifier (D3–D5), fed to the feedback point (R) and received by the feedback energy accumulation circuit (C1), as a result of which the potential of the pole of the secondary winding is clamped to the potential of the feedback point during a reflection phase.

2. Circuit arrangement according to claim 1, characterized in that the feedback energy accumulation circuit contains an electrical storage component whose top is connected to the feedback rectifier and whose bottom is connected to the reference potential, and thereby stores the reflected energy.

3. Circuit arrangement according to claim 2, characterized in that the electrical storage component is produced in the form of a capacitor.

4. Circuit arrangement according to claim 1, characterized in that the feedback energy accumulation circuit contains an electrical conversion component whose top is connected to the feedback rectifier and whose bottom is connected to the reference potential, and the reflected electrical energy is thereby converted into another form of energy.

5. Circuit arrangement according to claim 4, characterized in that the electrical conversion component is produced in the form of a resistor which converts the reflected energy into heat.

6. Circuit arrangement according to claims 2 or 4, characterized in that the feedback energy accumulation circuit consists of the connection of a capacitor and a resistor in parallel.

7. Circuit arrangement according to claim 2, characterized in that the feedback energy accumulation circuit consists of a capacitor (Cl) whose top is connected both to the feedback rectifier (D3–D5) and, via a rectifier (D1), to the charging impedance (L1), as a result of which the energy fed back is used as a contribution to the charging process of the charging capacitor (C2), the rectifier (D1) preventing reflection of the energy from the charging capacitor.

8. Circuit arrangement according to claim 1, characterized in that the charging impedance is produced by an inductor (L1).

9. Circuit arrangement according to claim 1, characterized in that the rectifiers are produced by semiconductor diodes (D1–D6).

10. Circuit arrangement according to claim 1, characterized in that the fast switch is produced by a transistor, in particular an IGBT (T1).

11. Circuit arrangement according to claim 1, characterized in that one pole each of the primary and secondary windings of the pulse transformer (TR1) are connected together and to the reference potential of the circuit arrangement.

* * * * *